US012637585B2

(12) United States Patent
Carreras et al.

(10) Patent No.: US 12,637,585 B2
(45) Date of Patent: May 26, 2026

(54) POWDER FOR AN ELECTRICALLY INSULATING COATING

(71) Applicant: ARKEMA FRANCE, Colombes (FR)

(72) Inventors: Santiago Carreras, Serquigny (FR); Jean-Yves Loze, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 0 days.

(21) Appl. No.: 18/269,228

(22) PCT Filed: Dec. 21, 2021

(86) PCT No.: PCT/FR2021/052411

§ 371 (c)(1),
(2) Date: Jun. 22, 2023

(87) PCT Pub. No.: WO2022/136789

PCT Pub. Date: Jun. 30, 2022

(65) Prior Publication Data

US 2024/0052198 A1 Feb. 15, 2024

(30) Foreign Application Priority Data

Dec. 23, 2020 (FR) ...................................... 2014033

(51) Int. Cl.

| | |
|---|---|
| ***C09D 177/02*** | (2006.01) |
| ***B05D 1/24*** | (2006.01) |
| ***C08G 59/44*** | (2006.01) |
| ***C08G 69/10*** | (2006.01) |
| ***C09D 5/03*** | (2006.01) |
| ***C09D 163/00*** | (2006.01) |
| ***H02G 5/00*** | (2006.01) |

(52) U.S. Cl.

CPC ............. *C09D 177/02* (2013.01); *B05D 1/24* (2013.01); *C08G 59/444* (2013.01); *C08G 69/10* (2013.01); *C09D 5/031* (2013.01); *C09D 5/032* (2013.01); *C09D 163/00* (2013.01); *H02G 5/00* (2013.01)

(58) Field of Classification Search

CPC ........ H02G 5/00; C09D 177/02; C09D 5/031; C09D 5/032; C09D 163/00

See application file for complete search history.

(56) References Cited

U.S. PATENT DOCUMENTS

| | | | | |
|---|---|---|---|---|
| 4,118,535 A | | 10/1978 | Banucci | |
| 5,409,999 A | * | 4/1995 | Merval | C09D 5/03 525/434 |
| 2013/0251931 A1 | * | 9/2013 | Liao | C09D 163/00 523/400 |
| 2015/0225576 A1 | * | 8/2015 | Aguirre Vargas | C08G 59/26 525/65 |
| 2016/0172074 A1 | * | 6/2016 | Stoppelmann | C09D 177/06 428/458 |
| 2020/0165482 A1 | | 5/2020 | Saito | |

FOREIGN PATENT DOCUMENTS

| | | | |
|---|---|---|---|
| EP | 0368543 | A2 | 5/1990 |
| EP | 0412888 | A1 | 2/1991 |
| JP | S61252276 | A | 11/1986 |
| JP | H641278 | A | 2/1994 |
| JP | S5268257 | B2 | 5/2013 |
| WO | 2011/092444 | A1 | 8/2011 |
| WO | 2020/084252 | A1 | 4/2020 |
| WO | 2020/242272 | A1 | 12/2020 |

OTHER PUBLICATIONS

International Search Report (PCT/ISA/210) with English translation mailed on Apr. 22, 2022, by the European Patent Office as the Internal Searching Authority for International Application No. (PCT/FR2021/052411).

Written Opinion of the International Searching Authority (PCT/ISA/220) mailed on Apr. 22, 2022, by the European Patent Office as the Internal Searching Authority for International Application No. (PCT/FR2021/052411).

Japanese Office Action Notice of Reasons for Rejection for Application No. 2023-538958 dated Nov. 18, 2025, with English translation, 8 pages.

* cited by examiner

*Primary Examiner* — Kelly M Gambetta
(74) *Attorney, Agent, or Firm* — Boone IP Law

(57) ABSTRACT

The invention relates to the use of a powder comprising at least one polyamide and at least one epoxy resin for producing an electrically insulating coating on a surface. The invention also relates to an electricity transmitting component at least partially covered with a coating that can be obtained by melting such a powder.

16 Claims, No Drawings

POWDER FOR AN ELECTRICALLY INSULATING COATING

FIELD OF THE INVENTION

The present invention relates to powders used for the formation of an electrically insulating coating and also to electricity transmitting components covered with such a coating.

TECHNICAL BACKGROUND

The electricity and electricity-storage markets are experiencing very significant growth year after year, due to population growth, the industrialization of developing countries, and more recently due to the rise of electric vehicles.

A certain number of components, such as busbars for example, must be electrically insulated. Epoxy resin powders are widely used for the formation of electrically insulating coatings. However, the use of such powders has drawbacks. Indeed, these powders have a low flexibility, which makes it difficult to machine a part with complex geometry after coating, without degrading the coating. Furthermore, the coatings obtained from these epoxy resin powders usually have a significant thickness, which leads to thermal insulation of the coated object and thus limits the discharge of heat. This can create overheating issues.

Document EP 0368543 describes a process for coating the surface of a substrate, in particular a busbar, wherein the substrate is masked by means of a masking composition which gels on contact with the heated substrate and then a resin powder is deposited on the non-masked portions of the substrate surface. The resin of the powder can be a thermoplastic resin, for example a polyamide resin, a polyester resin, a plasticized polyvinyl chloride resin or a polyolefin resin, or a thermosetting resin, for example an epoxy resin, a polyurethane resin, a polyester resin, an epoxy-polyester hybrid resin or an acrylic resin.

Documents WO 2011/092444 and WO 2020/084252 relate respectively to coating powders comprising a polyamide and a polypropylene glycol and to coating powders comprising a copolyamide having a melting point of less than or equal to 160° C. None of these documents mention electrical insulation properties.

Document WO 2020/242272 relates to a busbar surrounded by an insulating and heat-dissipating plastic part more than 500 μm thick and comprising a resin and a filler with high thermal conductivity. A layer of primer or an adhesive layer comprising an epoxy resin may be present between the plastic part and the busbar.

There is a real need to provide a powder allowing the formation of a coating on a surface having good electrical insulation properties and good mechanical properties and which may have low thermal insulation.

SUMMARY OF THE INVENTION

The invention relates firstly to the use of a powder comprising at least one polyamide and at least one epoxy resin for the production of an electrically insulating coating of a surface.

In embodiments, the powder comprises from 50 to 99.5% by weight of the at least one polyamide and from 0.5 to 50% by weight of the at least one epoxy resin, preferably from 80 to 99% by weight of the at least one polyamide and from 1 to 20% by weight of the at least one epoxy resin, even more preferentially from 95 to 99% by weight of the at least one polyamide and from 1 to 5% by weight of the at least one epoxy resin, relative to the total weight of the at least one polyamide and of the at least one epoxy resin.

In embodiments, the epoxy resin is a sulfonamide epoxy resin.

In embodiments, the polyamide is a homopolyamide, a copolyamide and/or a copolymer with polyamide blocks and with polyether blocks.

In embodiments, the polyamide is chosen from the group consisting of polyamide 11, polyamide 12, polyamide 6, polyamide 10, polyamide 6.10, polyamide 6.12, polyamide 6.14, polyamide 6.18, polyamide 10.10, polyamide 10.12, polyamide 10.14, PA 10.X/Y, wherein X is 10 or 12 and Y is 11, 12 or 14, and combinations thereof; preferably, the polyamide is polyamide 11.

In embodiments, the powder comprises polyamide particles having a volume median diameter Dv50 of from 10 to 200 μm, preferably from 20 to 100 μm, more preferentially from 30 to 60 μm.

In embodiments, the powder comprises epoxy resin particles having a volume median diameter Dv50 of from 1 to 20 μm, preferably from 2 to 10 μm, more preferentially from 3 to 5 μm.

In embodiments, the powder also comprises one or more additives chosen from the group consisting of pigments or dyes, anti-crater agents or spreading agents, reducing agents, antioxidants, reinforcing fillers, UV stabilizers, fluidizing agents and corrosion inhibitors, preferably in an amount of from 0 to 30% by weight, more preferably from 0 to 10% by weight, more preferentially from 0 to 5% by weight, relative to the total weight of the powder.

In embodiments, the electrically insulating coating is a film with a thickness of from 50 to 500 μm, preferably from 80 to 200 μm.

In embodiments, the surface is a metal surface, preferably a surface of an electricity transmitting component, more preferentially the surface of a busbar.

The invention also relates to an electricity transmitting component at least partially covered with a coating that can be obtained by melting a powder comprising at least one polyamide and at least one epoxy resin.

In embodiments, the electricity transmitting component is a busbar.

In embodiments, the powder is as described above.

In embodiments, the coating of the electricity transmitting component is a film with a thickness of from 50 to 500 μm, preferably from 80 to 200 μm.

The invention also relates to a process for coating the surface of an electricity transmitting component, comprising the following steps:

- optionally applying a mask to the surface;
- bringing the surface into contact with a powder as described above;
- melting the powder.

In embodiments, the step of bringing the surface into contact with the powder comprises the steps of:

- electrically charging the powder;
- spraying the electrically charged powder onto the surface;
- heating the powder-coated surface to a temperature above the melting point of the polyamide and above the melting point of the epoxy resin, preferably at least 30° C. above the melting point of the polyamide and above the melting point of the epoxy resin.

The present invention makes it possible to meet the need expressed above. It more particularly provides a powder that can be used for the production of a surface coating allowing an improved electrical insulation of said surface while at the same time being able to maintain a relatively low thermal insulation, and thus reduce the risks of overheating of the coated object. In addition, the coating obtained with the powder according to the invention can have the following advantages: have very good impact resistance; be ductile at low temperature (for example at 0° C.); have good flexibility allowing easy machining (by deformation, cutting, etc.) of the coated part; have good adhesion to metal surfaces.

This is accomplished through the use of a combination of at least one polyamide and at least one epoxy resin. This combination makes it possible to obtain a coating with very good electrical insulation even at low thickness. A low coating thickness has the advantage of limiting thermal insulation and therefore the risks of overheating of the part covered by the coating, in particular when it comes to an electricity transmitting component such as a busbar.

DETAILED DESCRIPTION

The invention is now described in more detail and in a nonlimiting way in the description which follows.

Unless otherwise indicated, all the percentages and proportions are mass percentages and proportions.

According to a first aspect, the invention relates to the use of a powder for producing an electrically insulating coating of a surface.

The term "electrically insulating coating" is intended to mean that the coating has a dielectric strength greater than or equal to 30 kV/mm. The dielectric strength of the coating can be measured according to the standard IEC 60243-1.

Coating Powder

The powder according to the invention comprises at least one polyamide and at least one epoxy resin.

The polyamide can be a homopolyamide and/or a copolyamide. It may consist solely of polyamide or may comprise one or more blocks of another type, for example chosen from polyether blocks, polyester blocks, polysiloxane blocks, such as polydimethylsiloxane (or PDMS) blocks, polyolefin blocks, polycarbonate blocks, and mixtures thereof.

According to one embodiment, the polyamide is aliphatic and linear.

According to one preferential embodiment, the polyamide is a semi-crystalline polyamide. The term "semi-crystalline polyamide" is intended to mean a polyamide which has:

- a crystallization temperature (Ct) determined, according to the standard ISO 11357-3:2013, during the step of cooling at a rate of 20 K/m in in DSC (differential scanning calorimetry);
- a melting point (Mp) determined, according to the standard ISO 11357-3:2013, during the step of heating at a rate of 20 K/min in DSC; and
- an enthalpy of fusion (ΔHf) determined, according to the standard ISO 11357-3: 2013, during the step of heating at a rate of 20 K/min in DSC, which is greater than 5 J/g, preferably greater than 10 J/g, for example greater than 20 J/g, and is generally less than 200 J/g, preferably less than 150 J/g.

Preferably, the polyamide according to the invention is an aliphatic and linear semi-crystalline polyamide.

The term "polyamide" is intended to mean a polymer comprising at least one product of polymerization of one or more monomers chosen from:

- monomers of amino acid or aminocarboxylic acid type, and preferably α,ω-aminocarboxylic acids;
- monomers of lactam type containing from 3 to 18 carbon atoms on the main ring and which may be substituted;
- monomers of "diamine.diacid" type derived from the reaction between an aliphatic diamine containing from 2 to 36 carbon atoms, preferably from 4 to 18 carbon atoms, and a carboxylic diacid containing from 4 to 36 carbon atoms, preferably from 4 to 18 carbon atoms; and
- mixtures thereof, with monomers containing a different carbon number in the case of mixtures between a monomer of amino acid type and a monomer of lactam type.

The term "monomer" in the present description of the polyamides should be taken to mean "repeat unit". This is because the case where a repeat unit of the polyamide (PA) consists of the combination of a diacid with a diamine is particular. It is considered that it is the combination of a diamine and a diacid, that is to say the diamine.diacid pair (in an equimolar amount), which corresponds to the monomer. This is explained by the fact that, individually, the diacid or the diamine is only a structural unit, which is not enough in itself alone to be polymerized.

When the polyamide is a homopolyamide, it comprises the product of polymerization of a single monomer. When the polyamide is a copolyamide, it comprises the product of polymerization of at least two different monomers. As examples of copolyamides formed from the various types of monomers described above, mention may be made of copolyamides resulting from the condensation of at least two α,ω-aminocarboxylic acids or of two lactams or of one lactam and one α,ω-aminocarboxylic acid. Mention may also be made of copolyamides resulting from the condensation of at least one α,ω-aminocarboxylic acid (or a lactam), at least one diamine and at least one dicarboxylic acid. Mention may also be made of copolyamides resulting from the condensation of an aliphatic diamine with an aliphatic dicarboxylic acid and at least one other monomer chosen from aliphatic diamines other than the preceding one and aliphatic diacids other than the preceding one.

Monomers of Amino Acid Type:

As examples of α,ω-amino acids, mention may be made of those containing from 4 to 18 carbon atoms, such as aminocaproic acid, 7-aminoheptanoic acid, 11-aminoundecanoic acid, N-heptyl-11-aminoundecanoic acid and 12-aminododecanoic acid.

Monomers of Lactam Type:

As examples of lactams, mention may be made of those containing from 3 to 18 carbon atoms on the main ring and which may be substituted. Mention may be made, for example, of β,β-dimethylpropiolactam, α,α-dimethylpropiolactam, amylolactam, caprolactam, also known as lactam 6, capryllactam, also known as lactam 8, oenantholactam and lauryllactam, also known as lactam 12.

Monomers of "Diamine.Diacid" Type:

Mention may be made, as examples of dicarboxylic acids, of the acids having from 4 to 36 carbon atoms. Mention may be made, for example, of adipic acid, sebacic acid, azelaic acid, suberic acid, isophthalic acid, butanedioic acid, 1,4-cyclohexyldicarboxylic acid, terephthalic acid, the sodium or lithium salt of sulfoisophthalic acid, dimerized fatty acids (these dimerized fatty acids have a dimer content of at least 98% by weight and are preferably hydrogenated), dodecanedioic acid $HOOC—(CH_2)_{10}—COOH$, and tetradecanedioic acid, preferably adipic acid, sebacic acid, azelaic acid, suberic acid, butanedioic acid, dimerized fatty acids (these dimerized fatty acids have a dimer content of at least 98% by weight and are preferably hydrogenated), dodecanedioic acid $HOOC—(CH_2)_{10}—COOH$, and tetradecanedioic acid.

The term “fatty acid dimers” or “dimerized fatty acids” is more particularly understood to mean the product of the dimerization reaction of fatty acids (generally containing 18 carbon atoms, often a mixture of oleic and/or linoleic acid). It is preferably a mixture comprising from 0 to 15% by weight of C18 monoacids, from 60% to 99% by weight of C36 diacids, and from 0.2% to 35% by weight of triacids or polyacids of C54 or more.

Examples of diamines include aliphatic diamines having from 2 to 36 atoms, preferably from 4 to 18 atoms. Mention may be made, by way of examples, of hexamethylenediamine, piperazine (abbreviated to “Pip”), aminoethylenepiperazine, tetramethylenediamine, octamethylenediamine, decamethylenediamine, dodecamethylenediamine, 1,5-diaminohexane, 2,2,4-trimethyl-1,6-diaminohexane, polyol diamines, isophoronediamine (IPD), methylpentamethylenediamine (MPMD), bis(aminocyclohexyl)methane (BACM), bis(3-methyl-4-aminocyclohexyl)methane (BMACM), meta-xylylenediamine, bis(p-aminocyclohexyl) methane, preferably hexamethylenediamine, tetramethylenediamine, octamethylenediamine, decamethylenediamine, dodecamethylenediamine, 1,5-diaminohexane, 2,2,4-trimethyl-1,6-diaminohexane, and polyol diamines.

As “diamines.diacids”, mention may more particularly be made of those resulting from the condensation of 1,6-hexamethylenediamine with a dicarboxylic acid having from 6 to 36 carbon atoms and those resulting from the condensation of 1,10-decamethylenediamine with a diacid having from 6 to 36 carbon atoms.

Mention may in particular be made, as examples of monomers of “diamine.diacid” type, of the monomers: 6.6, 6.10, 6.11, 6.12, 6.14 and 6.18. Mention may be made of monomers resulting from the condensation of decanediamine with a $C_6$ to $C_{36}$ diacid, in particular the monomers: 10.10, 10.12, 10.14 and 10.18. In the numeral notation X.Y, X represents the number of carbon atoms derived from the diamine residues and Y represents the number of carbon atoms derived from the diacid residues, as is conventional.

The polyamide preferably comprises at least one of the following monomers: 4.6, 5.6, 5.9, 5.10, 5.12, 5.13, 5.14, 5.16, 5.18, 5.36, 6, 6.6, 6.9, 6.10, 6.12, 6.13, 6.14, 6.16, 6.18, 6.36, 9, 10.6, 10.9, 10.10, 10.12, 10.13, 10.14, 10.16, 10.18, 10.36, 11, 12, 12.6, 12.9, 12.10, 12.12, 12.13, 12.14, 12.16, 12.18, 12.36, and mixtures thereof.

The polyamide of the powder according to the invention can be a copolymer with polyamide blocks (rigid or hard blocks, with a more thermoplastic behavior) and with soft blocks (or flexible blocks, with a more elastomeric behavior). The term “soft block” means a block with a glass transition temperature (Tg) of less than or equal to 0° C. The glass transition temperature may be determined by differential scanning calorimetry, according to the standard ISO 11357-2 Plastics—Differential scanning calorimetry (DSC) Part 2.

The polyamide blocks of the block copolymer can be polyamides (homopolyamides and/or copolyamides) as described above.

The soft blocks of the copolymer according to the invention can in particular be chosen from polyether (PE) blocks, polyester blocks, polysiloxane blocks, such as polydimethylsiloxane (or PDMS) blocks, polyolefin blocks, polycarbonate blocks, and mixtures thereof. Possible soft blocks are described, for example, in French patent application FR 2941700 A1, from page 32, line 3 to page 33, line 8, from page 34, line 16 to page 37, line 13 and on page 38, lines 6 to 23.

Preferably, the soft blocks are chosen from polyether blocks, polyester blocks, and a combination thereof.

Particularly advantageously, the soft blocks are polyether blocks. The copolymer according to the invention is a copolymer containing polyamide blocks and polyether blocks (or PEBA).

PEBAs result from the polycondensation of polyamide blocks comprising reactive end groups with polyether blocks comprising reactive end groups, such as, inter alia, the polycondensation:

1) of polyamide blocks comprising diamine chain ends with polyoxyalkylene blocks comprising dicarboxyl chain ends;
2) of polyamide blocks comprising dicarboxyl chain ends with polyoxyalkylene blocks comprising diamine chain ends, which are obtained, for example, by cyanoethylation and hydrogenation of aliphatic α,ω-dihydroxylated polyoxyalkylene blocks, known as polyetherdiols;
3) of polyamide blocks comprising dicarboxyl chain ends with polyetherdiols, the products obtained being, in this specific case, polyetheresteramides.

The polyamide blocks bearing dicarboxylic chain ends originate, for example, from the condensation of polyamide precursors in the presence of a chain-limiting dicarboxylic acid. The polyamide blocks bearing diamine chain ends originate, for example, from the condensation of polyamide precursors in the presence of a chain-limiting diamine.

The polyether blocks consist of alkylene oxide units.

The polyether blocks may notably be PEG (polyethylene glycol) blocks, i.e. blocks consisting of ethylene oxide units, and/or PPG (propylene glycol) blocks, i.e. blocks consisting of propylene oxide units, and/or PO3G (polytrimethylene glycol) blocks, i.e. blocks consisting of polytrimethylene glycol ether units, and/or PTMG (polytetramethylene glycol) blocks, i.e. blocks consisting of tetramethylene glycol units, also known as polytetrahydrofuran. The copolymers may comprise in their chain several types of polyethers, the copolyethers possibly being in block or random form.

Use may also be made of blocks obtained by oxyethylation of bisphenols, such as, for example, bisphenol A. The latter products are described in particular in document EP 613919.

The polyether blocks may also consist of ethoxylated primary amines. As examples of ethoxylated primary amines, mention may be made of the products of formula:

[Chem 1]

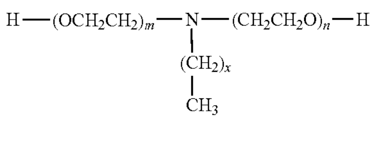

wherein m and n are integers between 1 and 20 and x is an integer between 8 and 18. These products are, for example, commercially available under the Noramox® brand name from CECA and under the Genamin® brand name from Clariant.

The soft polyether blocks may comprise polyoxyalkylene blocks bearing $NH_2$ chain ends, such blocks being able to be obtained by cyanoacetylation of α,ω-dihydroxylated aliphatic polyoxyalkylene blocks referred to as polyetherdiols. More particularly, the Jeffamine or Elastamine commercial products can be used (for example, Jeffamine® D400, D2000, ED 2003 or XTJ 542, which are commercial products from Huntsman, also described in documents JP 2004/346274, JP 2004/352794 and EP 1 482 011).

The polyether diol blocks are either used in unmodified form and copolycondensed with rigid blocks bearing carboxylic end groups, or are aminated to be converted into polyetherdiamines and condensed with rigid blocks bearing carboxylic end groups.

The general method for the two-step preparation of the PEBA copolymers having ester bonds between the PA blocks and the PE blocks is known and is described, for example, in document FR 2846332. The general method for preparing PEBA copolymers bearing amide bonds between the PA blocks and the PE blocks is known and described, for example in EP 1482011. The polyether blocks can also be mixed with polyamide precursors and a diacid chain limiter in order to prepare polymers comprising polyamide blocks and polyether blocks having randomly distributed units (one-step process).

Needless to say, the name PEBA in the present description of the invention relates not only to the Pebax® products sold by Arkema, to the Vestamid® products sold by Evonik® and to the Grilamid® products sold by EMS, but also to the Pelestat® type PEBA products sold by Sanyo or to any other PEBA from other suppliers.

The present invention covers copolymers comprising a single polyamide block and a single soft block, but also copolymers comprising three, four (or even more) different blocks chosen from those described in the present description, provided that these blocks comprise at least one polyamide block and one soft block.

For example, the copolymer may be a segmented block copolymer comprising three different types of blocks (or "triblock" copolymer), which results from the condensation of several of the blocks described above. Said triblock may for example be a copolymer comprising a polyamide block, a polyester block and a polyether block or a copolymer comprising a polyamide block and two different polyether blocks, for example a PEG block and a PTMG block.

Advantageously, the polyamide used in the invention is a polyamide (or comprises polyamide blocks) PA 6, PA 10, PA 11, PA 12, PA 5.4, PA 5.9, PA 5.10, PA 5.12, PA 5.13, PA 5.14, PA 5.16, PA 5.18, PA 5.36, PA 6.4, PA 6.9, PA 6.10, PA 6.12, PA 6.13, PA 6.14, PA 6.16, PA 6.18, PA 6.36, PA 10.4, PA 10.9, PA 10.10, PA 10.12, PA 10.13, PA 10.14, PA 10.16, PA 10.18, PA 10.36, PA 12.4, PA 12.9, PA 12.10, PA 12.12, PA 12.13, PA 12.14, PA 12.16, PA 12.18, PA12.36, PA 6.6/6, PA 6.6/6.10/11/12, PA 10.10/11, PA 10.10/12, PA 10.10/14, PA 10.12/11, PA 10.12/12, PA 10.12/14, or mixtures or copolymers thereof. In the PA X notation, X represents the number of carbon atoms derived from amino acid residues or from lactam residues. The notations PA X/Y, PA X/Y/Z, etc. relate to copolyamides wherein X, Y, Z, etc. represent homopolyamide units as described above.

Preferably, the polyamide according to the invention is chosen from PA 11, PA 12, PA 6, PA 6.$X_1$, PA 10, PA 10.$X_2$, PA 10.$X_3$/Y or combinations thereof. Preferably, from the list above, $X_1$ is chosen from 10, 12, 14 or 18. Preferably, from the list above, $X_2$ is chosen from 10, 12 or 14. Preferably, from the list above, $X_3$ is chosen from 10 or 12. Preferably, from the list above, Y is chosen from 11, 12 or 14.

Advantageously, the polyamide of the powder is one (or more) homopolyamide(s).

Particularly preferably, the polyamide is polyamide 11.

The polyamide can advantageously have an inherent viscosity ranging from 0.5 to 1.5 $(g/100\ g)^{-1}$, preferably 0.8 to 1.0 $(g/100\ g)^{-1}$. The inherent viscosity is measured using an Ubbelohde tube. The measurement is taken at 20° C. on a 75 mg sample at a concentration of 0.5% (m/m) in m-cresol. The inherent viscosity is expressed in $(g/100\ g)^{-1}$ and is calculated according to the following formula: Inherent viscosity=$\ln(t_s/t_0)\times 1/C$, with $C=m/p\times 100$, wherein $t_s$ is the flow time of the solution, $t_0$ is the flow time of the solvent, m is the mass of the sample of which the viscosity is determined and p is the mass of the solvent. This measurement corresponds to the standard ISO 307 apart from the fact that the measuring temperature is 20° C. instead of 25° C.

Preferably, the volume median diameter Dv50 of the polyamide particles of the powder is from 10 to 200 μm, more preferentially from 20 to 100 μm, even more preferentially from 30 to 60 μm. For example, the Dv50 of the polyamide particles of the composition can be from 10 to 20 μm; or from 20 to 30 μm; or from 30 to 40 μm; or from 40 to 50 μm; or from 50 to 60 μm; or from 60 to 80 μm; or from 80 to 100 μm; or from 100 to 120 μm; or from 120 to 150 μm; or from 150 to 200 μm.

The Dv50 corresponds to the particle size at the $50^{th}$ percentile (in volume) of the cumulative particle size distribution. It can be determined according to the standard ISO 9276—parts 1 to 6.

The epoxy resin preferably denotes a compound or a mixture of compounds containing, on average, at least one 1,2-epoxy group per molecule, making it possible to adhere to the metal surface of the electricity transmitting components.

Typically, the 1,2-epoxy group can be a ($-CH_2CHOCH_2$) unit present in glycidyl ethers, glycidyl esters or glycidylamine.

The epoxy resin is advantageously a sulfonamide epoxy resin.

Sulfonamide epoxy resins can be obtained by reacting sulfonamide compounds and epoxy compounds. The sulfonamide compounds can be chosen, for example, from halogenated or non-halogenated benzene monosulfonamide derivatives, such as benzene sulfonamide, nitrobenzene sulfonamide, ortho-, meta- or para-toluene sulfonamide, aminoalkyl benzene sulfonamides, naphthalene or xylene sulfonamide.

Any other epoxy resin can also be used in the present invention. Mention may be made of bisphenol A diglycidyl ethers, bisphenol F diglycidyl esters, novolac resin glycidyl ethers, novolac cresol epoxy resins, novolac phenolic epoxy resins, novolac alkylphenolic epoxy resins, hydrogenated bisphenol A diglycidyl ethers, hydrogenated bisphenol AD diglycidyl ethers, diglycidyl ethers of a polyol such as propylene glycol or pentaerythritol, epoxy resins obtained by reaction of an aliphatic or aromatic carboxylic acid with epichlorohydrin, epoxy resins obtained by reaction of an aliphatic or aromatic amine with epichlorohydrin, heterocyclic epoxy resins, and epoxy resins containing a spiro nucleus.

The above epoxy resins may be used alone or in combination.

Advantageously, the volume median diameter Dv50 of the epoxy resin particles of the powder is from 1 to 20 μm, more preferentially from 2 to 10 μm, even more preferentially from 3 to 5 μm. In embodiments, the Dv50 of the epoxy resin particles is 1 to 2 μm, or 2 to 3 μm, or 3 to 4 μm, or 4 to 5 μm, or 5 to 6 μm, or 6 to 8 μm, or 8 to 10 μm, or 10 to 12 μm, or 12 to 15 μm, or 15 to 20 μm. The Dv50 of the particles can be measured as described above.

Preferably, the powder comprises from 50 to 99.5% by weight of polyamide and from 0.5 to 50% by weight of epoxy resin, preferably from 80 to 99% by weight of polyamide and from 1 to 20% by weight of epoxy resin, even more preferentially from 95 to 99% by weight of polyamide and from 1 to 5% by weight of epoxy resin, relative to the total weight of the polyamide and of the epoxy resin. Such amounts make it possible to improve the mechanical properties, in particular the flexibility, of the coating formed from the powder. In particular, the powder may comprise from 50 to 60%, or from 60 to 70%, or from 70 to 80%, or from 80 to 85%, or from 85 to 90%, or from 90 to 91%, or from 91 to 92%, or from 92 to 93%, or from 93 to 94%, or from 94 to 95%, or from 95 to 96%, or from 96 to 97%, or from 97 to 98%, or from 98 to 99%, or from 99 to 99.5% by weight, of polyamide, relative to the total weight of the polyamide and the epoxy resin.

Advantageously, the powder comprises from 55 to 99% by weight of polyamide and from 0.5 to 44% by weight of epoxy resin, more preferably from 75 to 98% by weight of polyamide and from 2 to 20% by weight of epoxy resin, more preferably from 90 to 97% by weight of polyamide and from 2.5 to 6% by weight of epoxy resin, relative to the total weight of the powder.

The powder according to the invention may also comprise one or more additives chosen from the group consisting of pigments and dyes, anti-crater agents and spreading agents, reducing agents, antioxidants, reinforcing fillers, UV stabilizers, fluidizing agents, corrosion inhibitors, and mixtures thereof. These additives are preferably present in a mass amount, relative to the total mass of the powder, of from 0 to 30%, more preferably from 0 to 20%, more preferentially from 0 to 10%, even more preferentially from 0 to 5%, for example from 0 to 2%, or from 2 to 5%, or from 5% to 10%, or from 10% to 15%, or from 15% to 20%, or from 20% to 25%, or from 25% to 30%.

The reinforcing filler may be of any type that is suitable for preparing powders based on polyamide and on epoxy resin. However, it is preferable for the filler to be selected from the group consisting of talc, calcium carbonates, manganese carbonates, potassium silicates, aluminum silicates, dolomite, magnesium carbonates, quartz, boron nitride, kaolin, wollastonite, titanium dioxide, glass beads, mica, carbon black, mixtures of quartz, mica and chlorite, feldspar and dispersed nanometric fillers such as carbon nanotubes and silica. The filler is particularly preferably calcium carbonate.

The pigment may be of any type known to those skilled in the art. Preferably, the pigment is selected from the group consisting of titanium dioxide, carbon black, cobalt oxide, nickel titanate, molybdenum disulfide, aluminum flakes, iron oxide, zinc oxide, organic pigments, such as phthalocyanine and anthraquinone derivatives, and zinc phosphate.

The dye may be of any type known to those skilled in the art. Preferably, the dye according to the invention is selected from the group consisting of azo dyes, anthraquinone dyes, indigo-based dyes, triarylmethane dyes, chlorine dyes and polymethine dyes.

The anti-crater agent and/or spreading agent may be of any type known to those skilled in the art. Preferably, the anti-crater agent and/or spreading agent is selected from the group consisting of polyacrylate derivatives.

The UV stabilizer may be of any type known to those skilled in the art. Preferably, the UV stabilizer is selected from the group consisting of resorcinol derivatives, benzotriazoles, phenyltriazines and salicylates.

The antioxidants may be of any type known to those skilled in the art. Preferably, the antioxidants are selected from the group consisting of copper iodide combined with potassium iodide, phenol derivatives and hindered amines.

The fluidizing agent may be of any type known to those skilled in the art. Preferably, the fluidizing agent is selected from the group consisting of aluminas and silicas.

The corrosion inhibitors may be of any type known to those skilled in the art. Preferably, the corrosion inhibitors are selected from the group consisting of phosphosilicates and borosilicates.

In embodiments, the powder according to the invention consists essentially, or consists, of the polyamide and the epoxy resin, and optionally one or more additives as described above.

The powder according to the invention can be prepared by dry mixing its various constituents, in particular polyamide and epoxy resin and optionally additives, in powder form. The mixing may be performed in one step (the constituents all being added to the mixture simultaneously) or in several steps (a premix of some constituents first being made, followed by the addition of other constituents).

Use for coating a surface According to the invention, the powder described above is used for the electrically insulating coating of a surface. The surface may be totally or partly coated.

Advantageously, the coating is a film obtained by melting the powder described above. Preferably, the film has a thickness of from 50 to 500 μm, more preferentially from 80 to 200 μm, even more preferentially from 100 to 150 μm. In embodiments, the film has a thickness of from 50 to 80 μm, or from 80 to 100 μm, or from 100 to 150 μm, or from 150 to 200 μm, or from 200 to 250 μm, or from 250 to 300 μm, or from 300 to 350 μm, or from 350 to 400 μm, or from 400 to 450 μm, or from 450 to 500 μm.

The coating may have a dielectric strength, measured according to the standard IEC 60243-1, of greater than or equal to 40 kV/mm, preferably greater than or equal to 50 kV/mm, even more preferentially greater than or equal to 60 kV/mm.

The surface is preferably a metal surface. The term "metal surface" means a surface which comprises, consists essentially of or consists of one or more metals.

The metal surface may be of any type. Preferably, the metal surface is the surface of a part selected from the group consisting of copper or copper alloy parts and aluminum or aluminum alloy parts, and parts comprising such metals.

The surface, preferably the metal surface (for example made of copper, copper alloy, aluminum or aluminum alloy) was able to undergo one or more surface treatments that are well known to those skilled in the art and preferably selected from the group consisting of coarse degreasing, alkaline degreasing, brushing, shot-blasting or sand-blasting, fine degreasing, hot rinsing, phosphating degreasing, iron/zinc/tri-cation phosphatations, chromating, cold rinsing and chromic rinsing. Thus, the powder may be used for coating treated or untreated metal surfaces.

In particular, the coated surface may be the surface of an electricity transmitting component, such as a busbar or an electric cable or wire; preferably, the surface is that of a busbar. The electricity transmitting component can be totally covered by the coating but is preferably partially covered by the electrically insulating coating.

The electricity transmitting component, in particular the busbar, advantageously comprises copper, a copper alloy, aluminum and/or an aluminum alloy, and even more advantageously is made of copper, a copper alloy, aluminum and/or aluminum alloy.

The invention also relates to a process for producing an electrically insulating coating of a surface, comprising the coating of the surface using a powder as described above. The coating and the surface can be as described above. Preferably, the step of coating the surface comprises bringing the surface into contact with the powder and melting the powder.

A subject of the invention is also an electricity transmitting component at least partially covered with a coating that can be obtained by melting the powder as described above or with a coating obtained by melting powder as described above. What has been described above in relation to the coating powder, to the coating and to the electricity transmitting component can be applied in the same way to this aspect of the invention.

Particularly preferably, the electricity transmitting component is a busbar.

The electricity transmitting component bearing the electrically insulating coating can be used in a battery, for example an electric vehicle battery.

The invention also relates to a process for coating a surface of an electricity transmitting component comprising the following steps:

- placing the surface in contact with the powder as described above;
- melting the powder.

Before bringing the surface into contact with the powder, the coating process may include a step of applying a mask to the surface, in particular when the electricity transmitting component must only be partially covered by the coating. The application of a mask makes it possible to selectively coat only certain parts of the part to be coated. The powder is then brought into contact with non-masked parts of the surface to be coated.

The powder may be applied onto or placed in contact with a surface according to numerous coating techniques that are well known to those skilled in the art. Preferably, the coating according to the invention is performed via a method selected from the group consisting of dipping in a fluidized bed, electrostatic spraying and hot dusting.

Even more preferably, the coating is produced by electrostatic spraying. The use of an electrostatic spraying process is advantageous because this process can be carried out at a lower temperature than the fluidized bed dipping process, thereby making it possible to reduce the risks of degradation of the part to be coated and/or of the mask. The step of bringing the surface into contact with the powder may then comprise the steps of:

- electrically charging the powder;
- spraying the electrically charged powder onto the surface;
- heating the powder-coated surface to a temperature above the melting point of the polyamide and above the melting point of the epoxy resin.

Coating by electrostatic spraying consists in depositing electrostatically charged powder particles onto a surface, notably at ambient temperature. The powder may be electrostatically charged during its passage through the nozzle of spraying equipment. The powder composition thus charged can then be sprayed onto the object comprising the surface to be coated, which is connected to a zero potential. The coated object can then be placed in an oven at a temperature allowing melting of the composition.

The powder spraying equipment may be of any type. Preferably, the nozzle is brought to a high potential of between about 10 and about 100 kV, of negative or positive polarity. Preferably, the powder spraying equipment is an electrostatic gun which charges the powder by the Corona effect and/or by triboelectrization.

Preferably, the powder flow rate in the spraying equipment is from 10 to 200 g/minute and more preferably from 50 to 120 g/minute.

Preferably, the temperature of electrostatic application of the powder is from 15° C. to 25° C.

Preferably, the residence time of the surface in the oven is from 3 to 15 minutes.

Advantageously, the surface heating temperature may be from 180 to 300° C., preferably from 200 to 250° C.

The heating temperature of the powder-coated surface may preferably be at least 30° C. higher than the melting point of the polyamide and than that of the epoxy resin, more preferably 30 to 60° C. higher than the melting point of the polyamide and than the melting point of the epoxy resin.

The surface may then be cooled, for example to ambient temperature.

If a mask was used, it can be removed.

Alternatively, the coating can be carried out by dipping in a fluidized bed. Thus, the step of placing the surface in contact with the powder may comprise the steps of:

- heating the surface to a temperature above the melting point of the polyamide and above the melting point of the epoxy resin;
- dipping the surface in a fluidized bed comprising the powder.

The surface to be coated is preheated to a temperature allowing the melting of the powder according to the invention. The surface is then immersed in a fluidized bed comprising a powder according to the invention. The powder melts on contact with the surface and forms a coating thereon. The coated surface is then preferably cooled, for example in the ambient air. When present, the mask can then be removed.

Preferably, the fluidized air for the fluidization of the composition is cold, clean and free of oil.

Preferably, the surface heating temperature is from 180 to 450° C., preferably from 250 to 350° C.

More preferably, the heating of the surface is carried out at a temperature at least 30° C. higher than the melting point of the polyamide and than the melting point of the epoxy resin, more preferably at a temperature from 30 to 120° C. higher than the melting point of the polyamide and than the melting point of the epoxy resin.

Preferably, the duration of dipping of the surface in the fluidized bed is from 1 to 10 seconds, more preferentially from 3 to 7 seconds. Dipping of the surface in the fluidized bed may take place one or more times (each dipping preferably having a duration of from 1 to 10 seconds, more preferentially from 3 to 7 seconds).

In other embodiments, the coating is performed by hot dusting. The step of placing the surface in contact with the powder then comprises the steps of:

- heating the surface to a temperature above the melting point of the polyamide and above the melting point of the epoxy resin;
- spraying the powder onto the surface.

The surface heating temperature may be as described above in relation with coating by dipping in a fluidized bed. It is preferably in particular at least 30° C. higher than the melting point of the polyamide and than the melting point of the epoxy resin, more preferably at a temperature 30 to 120° C. higher than the melting point of the polyamide and than the melting point of the epoxy resin.

The surface may then be cooled, for example to room temperature. When a mask has been used, it can be removed. The sprayed powder may or may not be electrostatically charged.

The characteristics described above in relation to the use of the powder for coating a surface (notably regarding the description of the electricity transmitting component and the thickness of the coating film) may apply in the same manner to the coating processes.

EXAMPLE

The example that follows illustrates the invention without limiting it.

The following powders were used to form coatings. They were prepared by dry-mixing of the components in the amounts (indicated as mass percentage) specified in the table below:

| | Powder 1 | Powder 2 | Powder 3 |
|---|---|---|---|
| Polyamide 11 | 78.7 | 85.5 | 81.9 |
| Sulfonamide epoxy resin | 2.9 | 0.0 | 0.0 |
| Additives (antioxidant, pigments, anti-crater) | 18.4 | 14.5 | 18.1 |
| Total: | 100.0 | 100.0 | 100.0 |

The sulfonamide epoxy resin used in powders 1, 2 and 3 is sold under the name SR9 Resin (p-Toluenesulfonamide-Epoxy condensation polymer) by Nylon Colours.

These powders were characterized by measuring the Dv50 according to the standard ISO 9276—parts 1 to 6.

| | Powder 1 | Powder 2 | Powder 3 |
|---|---|---|---|
| Dv50 [µm] | 34 | 116 | 34 |

With these powders, different coatings were produced on copper or aluminum busbars of which the surface had been treated, or was untreated, as described below:

Coating no. 1: the surface to be coated was cleaned and shot-blasted; powder no. 1 was then applied to the surface by electrostatic spraying, the busbar was subjected to post-melting at 220° C. in an oven followed by air cooling. The coating has an average thickness of 130 µm.

Coating no. 2: the surface to be coated was cleaned and shot-blasted, then was preheated to 300° C.; powder no. 2 was then applied to the surface by dipping in a fluidized bed, and the busbar was subjected to air cooling. The coating has an average thickness of 340 µm.

Coating no. 3: the surface to be coated was cleaned and shot-blasted, then a bonding primer was applied to the surface; powder no. 3 was then applied to the surface by electrostatic spraying, then the busbar was subjected to post-melting at 220° C. in an oven followed by air cooling. The coating has an average thickness of 125 µm.

Coating no. 4: powder no. 3 was applied to the surface by electrostatic spraying in the same way as for coating no. 3 except that the procedure, apart from the step of applying the bonding primer, was repeated a second time. The coating has an average thickness of 250 µm.

The dielectric strength of coatings no. 1, no. 2, no. 3 and no. 4 was measured according to the standard IEC 60243-1.

In addition, the dielectric strength of the following coatings was estimated from the available technical information of the corresponding powders:

Coating no. 5: coating with a thickness of 250 µm, obtained with an epoxy resin powder sold under the trade name Interpon 100 AG114QF by AkzoNobel.

Coating no. 6: coating with a thickness of 300 µm, obtained with an epoxy resin powder sold under the trade name Scotchcast® 262 Red by 3M.

Coating no. 7: coating with a thickness of 250 µm, obtained with an epoxy resin powder sold under the trade name Resicoat EL 201 by AkzoNobel.

The results are presented in the following table:

AM 4625

| Coating no. | Powder | Coating thickness (µm) | Dielectric strength (kV/mm) |
|---|---|---|---|
| 1 | Powder no. 1 | 130 | 64.8 |
| 2 | Powder no. 2 | 340 | 38.7 |
| 3 | Powder no. 3 | 125 | 55.8 |
| 4 | Powder no. 3 | 250 | 51.9 |
| 5 | Interpon 100 AG114QF | 250 | 47.2 |
| 6 | Scotchcast ® 262 Red | 300 | 39.4 |
| 7 | Resicoat EL 201 | 250 | 47 |

It can be seen that for a given coating thickness, powder no. 1 makes it possible to obtain a coating with better electrical insulation properties than the other powders tested comprising only polyamide 11. The coating obtained with powder no. 1 is also more electrically insulating than the coatings prepared from a powder comprising only an epoxy resin.

In addition, powder no. 1 makes it possible to obtain good electrical insulation properties with relatively thin coatings.

The invention claimed is:

1. An electricity transmitting component at least partially covered with a coating that can be obtained by melting a powder comprising at least one polyamide and at least one epoxy resin, wherein the epoxy resin is selected from the group consisting of sulfonamide epoxy resins, bisphenol A diglycidyl ethers, bisphenol F diglycidyl esters, novolac resin glycidyl ethers, novolac cresol epoxy resins, novolac phenolic epoxy resins, novolac alkylphenolic epoxy resins, hydrogenated bisphenol A diglycidyl ethers, hydrogenated bisphenol AD diglycidyl ethers, diglycidyl ethers of a polyol, epoxy resins obtained by reaction of an aliphatic or aromatic carboxylic acid with epichlorohydrin, epoxy resins obtained by reaction of an aliphatic or aromatic amine with epichlorohydrin, heterocyclic epoxy resins, and epoxy resins containing a spiro nucleus, wherein the powder comprises from 50 to 99.5% by weight of the at least one polyamide and from 0.5 to 50% by weight of the at least one epoxy resin.

2. The electricity transmitting component as claimed in claim 1, which is a busbar.

3. The electricity transmitting component as claimed in claim 1, wherein the powder comprises from 75 to 98% by weight of the at least one polyamide and from 2 to 20% by weight of the at least one epoxy resin.

4. The electricity transmitting component as claimed in claim 1, wherein the coating is a film with a thickness of from 50 to 500 μm.

5. A process for coating the surface of the electricity transmitting component according to claim 1, comprising the following steps:

optionally applying a mask to the surface;

bringing the surface into contact with the powder comprising at least one polyamide and at least one epoxy resin;

melting the powder.

6. The process as claimed in claim 5, wherein the step of bringing the surface into contact with the powder comprises the steps of:

electrically charging the powder;

spraying the electrically charged powder onto the surface;

heating the powder-coated surface to a temperature above the melting point of the polyamide and above the melting point of the epoxy resin.

7. The electricity transmitting component as claimed in claim 1, wherein the epoxy resin is a sulfonamide epoxy resin.

8. The electricity transmitting component as claimed in claim 1, wherein the polyamide is a homopolyamide, a copolyamide and/or a copolymer with polyamide blocks and with polyether blocks.

9. The electricity transmitting component as claimed in claim 1, wherein the polyamide is chosen from the group consisting of polyamide 11, polyamide 12, polyamide 6, polyamide 10, polyamide 6.10, polyamide 6.12, polyamide 6.14, polyamide 6.18, polyamide 10.10, polyamide 10.12, polyamide 10.14, PA 10.X/Y, wherein X is 10 or 12 and Y is 11, 12 or 14, and combinations thereof.

10. The electricity transmitting component as claimed in claim 1, wherein the powder comprises polyamide particles having a volume median diameter Dv50 of from 10 to 200 μm.

11. The electricity transmitting component as claimed in claim 1, wherein the powder comprises epoxy resin particles having a volume median diameter Dv50 of from 1 to 20 μm.

12. The electricity transmitting component as claimed in claim 1, wherein the powder also comprises one or more additives chosen from the group consisting of pigments or dyes, anti-crater agents or spreading agents, reducing agents, antioxidants, reinforcing fillers, UV stabilizers, fluidizing agents and corrosion inhibitors.

13. The electricity transmitting component as claimed in claim 1, wherein the surface is a metal surface.

14. An electricity transmitting component at least partially covered with a coating that can be obtained by melting a powder comprising a polyamide and a sulfonamide epoxy resin.

15. The electricity transmitting component as claimed in claim 14, which is a busbar.

16. The electricity transmitting component as claimed in claim 14, wherein the coating is a film with a thickness of from 50 to 500 μm.

* * * * *